(12) United States Patent
Abney, III et al.

(10) Patent No.: US 8,047,566 B2
(45) Date of Patent: Nov. 1, 2011

(54) SIDE AIRBAG CUSHION AND METHOD OF MANUFACTURE

(75) Inventors: William Abney, III, Richmond, IN (US); Dayne B. Hassett, Centerville, OH (US); Ryan T. Pinsenschaum, Dayton, OH (US); Douglas S. Weston, Tipp City, OH (US); Mark T. Winters, Troy, OH (US); Mike F. Fink, Mesa, AZ (US)

(73) Assignee: Nxgen Technologies Inc., Meza, AZ (US)

( * ) Notice: Subject to any disclaimer, the term of this patent is extended or adjusted under 35 U.S.C. 154(b) by 0 days.

(21) Appl. No.: 12/772,653

(22) Filed: May 3, 2010

(65) Prior Publication Data

US 2010/0270781 A1 Oct. 28, 2010

Related U.S. Application Data

(62) Division of application No. 11/866,992, filed on Oct. 3, 2007, now Pat. No. 7,708,308.

(51) Int. Cl.
*B60R 21/16* (2006.01)
(52) U.S. Cl. .................................................... 280/730.2
(58) Field of Classification Search ............... 280/730.2, 280/743.1
See application file for complete search history.

(56) References Cited

U.S. PATENT DOCUMENTS

| | | | |
|---|---|---|---|
| 6,672,612 B2 * | 1/2004 | Sauer et al. | 280/730.2 |
| 7,331,602 B2 * | 2/2008 | Ochiai et al. | 280/730.2 |
| 7,469,922 B2 * | 12/2008 | Kino et al. | 280/729 |
| 2003/0052477 A1 * | 3/2003 | Challa et al. | 280/730.2 |
| 2003/0090094 A1 * | 5/2003 | Zerbe | 280/730.2 |
| 2003/0230876 A1 * | 12/2003 | Ohrvall et al. | 280/730.2 |
| 2004/0056456 A1 * | 3/2004 | Ikeda et al. | 280/730.2 |
| 2004/0108694 A1 * | 6/2004 | Takahashi | 280/730.2 |
| 2004/0251666 A1 * | 12/2004 | Shaker et al. | 280/730.2 |
| 2005/0280249 A1 * | 12/2005 | Gorecki et al. | 280/730.2 |

* cited by examiner

*Primary Examiner* — Paul N Dickson
*Assistant Examiner* — Robert A Coker
(74) *Attorney, Agent, or Firm* — Cantor Colburn, LLP

(57) ABSTRACT

Exemplary embodiments are directed to an inflatable cushion for deployment along an interior side of a vehicle. In one exemplary embodiment the inflatable cushion has: an inflatable portion, the inflatable portion partially surrounding an area; a non-inflatable member secured to the inflatable portion and positioned in the area; and a retentive pocket formed by the non-inflatable member and the inflatable cushion, the retentive pocket having a periphery bounded on at least one side by the non-inflatable member and the non-inflatable member being configured such that a recessed area is formed in the retentive pocket, the recessed area being disposed within the periphery of the retentive pocket.

8 Claims, 6 Drawing Sheets

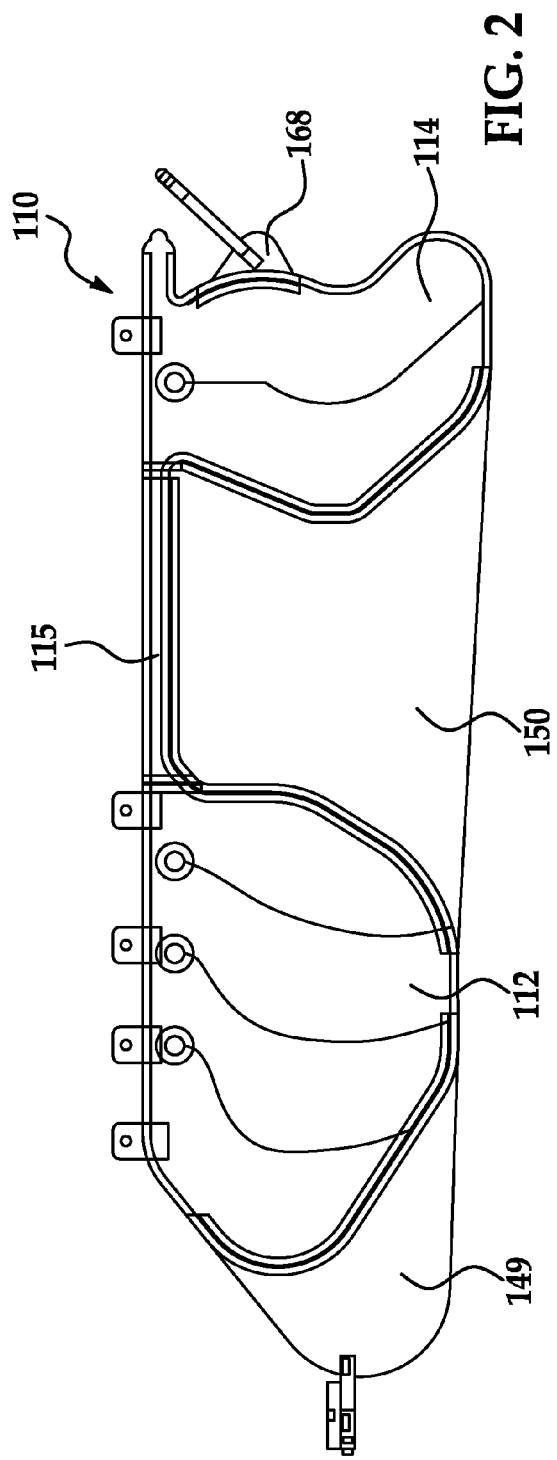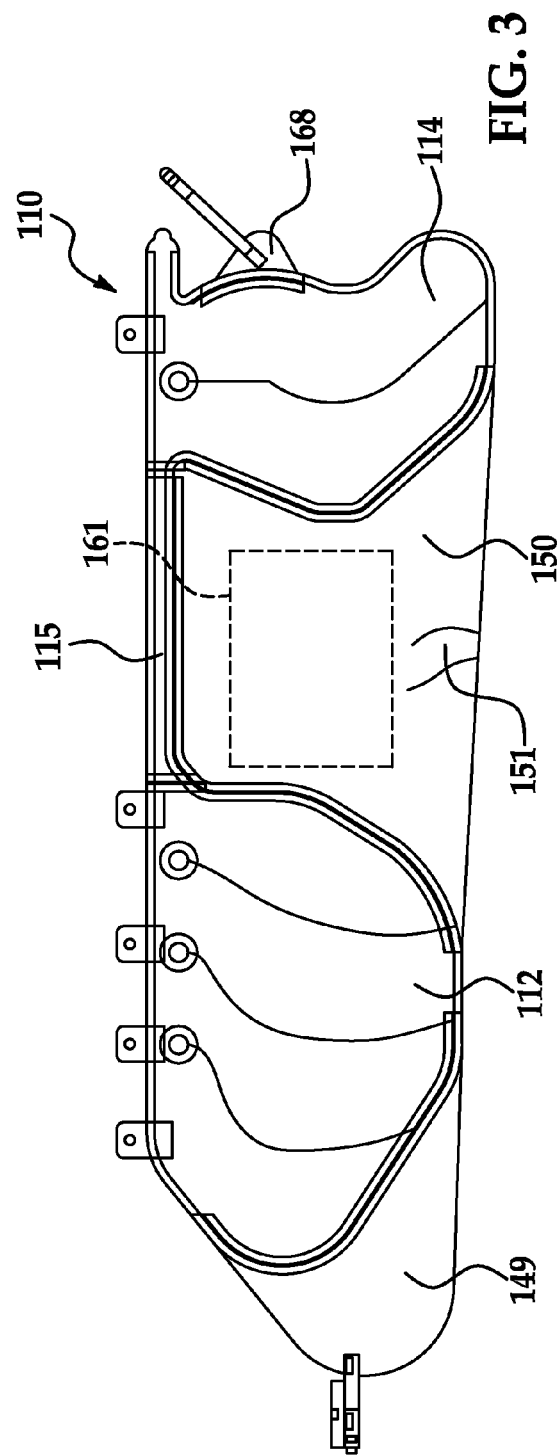

SIDE AIRBAG CUSHION AND METHOD OF MANUFACTURE

CROSS REFERENCE TO RELATED APPLICATIONS

This application is a divisional of U.S. patent application Ser. No. 11/866,992 filed Oct. 3, 2007 now U.S. Pat. No. 7,708,308 which claims the benefit of U.S. Provisional Patent Application Ser. No. 60/828,765 filed Oct. 9, 2006, the contents each of which are incorporated herein by reference thereto.

BACKGROUND

The present invention relates to side airbag devices and more particularly the present invention relates to an inflatable cushion and method of manufacture.

Some vehicles are supplied with side airbag devices or side airbag curtains. Generally the device is located along a side of the vehicle and deploys an inflatable curtain in accordance with a predetermined activation occurrence. The side impact airbags or inflatable cushions are often mounted in close proximity to the vehicle's roof rail, doorframe or center pillars, or in some instances within the side door. Accordingly, the space or housing for the un-inflated airbag is compact and extends or traverses along the window area or frame, as the airbag cannot be installed in the areas comprising the window. Moreover, it is also desirable to have the inflatable cushion disposed behind a decorative trim portion of the vehicle's interior. Thus, the presence of the side airbag device is not observable to occupants when it is in its un-deployed state.

When the airbag or inflatable cushion is mounted to the vehicle the top edge portion is fixed and a lower edge portion, which defines the bottom periphery of the airbag, deploys out of the storage location positioned in close proximity to the roof rail. Furthermore, and referring in particular to larger or longer vehicles (e.g., sports utility vehicles, vans, mini-vans, station wagons, etc.) a single side airbag or inflatable cushion that extends from the A pillar to the D pillar, or further, of the vehicle has to have an extended length to cover the side areas of the vehicle. Accordingly, these extended inflatable cushions require additional inflator output in order to inflate and maintain the inflation of the cushion for a pre-determined period of time.

In addition, and due to the location of deployment of these cushions (e.g., vehicle side, A-D pillars) it is desirable to provide these cushions with an extended period of inflation. Moreover, and depending on the vehicle type other areas of the cushion that traverse across the interior of the vehicle may not require inflation. However, these areas still comprise a portion of the inflatable cushion.

The required extended period of inflation may comprise up to and exceed five seconds. These extended periods of inflation allow the inflatable cushion to provide a retentive barrier across the opening of the windows of the vehicle. In order to provide inflation cushions which retain their inflation gases for extended periods of time the cushion is in one configuration provided with sealed seams in accordance with the teachings of U.S. Pat. No. 6,220,309, the contents of which are incorporated herein by reference thereto. Alternatively, sealed cushions are provided by disposing sealing material such as silicone between the edges of two sheets of fabric members comprising the inflatable cushion. In addition, these types of cushions (e.g., less permeable cushions or cushions that retain inflation gases for extended periods of time) are expensive to manufacture. Accordingly and as side impact inflation cushions become larger in order to cover extended lengths and areas their associated costs increase.

Alternatively, a plurality of cushions may be provided each having a separate inflator and installation location, which will result in additional costs. Moreover, usage of multiple cushions with additional inflators will result the requirement of additional space behind the interior trim as well as associated manufacturing costs for multiple installation locations.

Accordingly, it is desirable to provide a cost-efficient side airbag module wherein a plurality of separate inflatable cushions are provided without the associated costs. In addition, it is also desirable to provide an inflatable cushion for a side airbag module wherein the same is configured to provide a portion of a retentive barrier.

SUMMARY OF THE INVENTION

Exemplary embodiments of the present invention relate to a side airbag and method for making. In an exemplary embodiment, an inflatable cushion and method of making an inflatable cushion for deployment along an interior side of a vehicle is disclosed.

In one exemplary embodiment, an inflatable cushion is provided. Exemplary embodiments are directed to an inflatable cushion for deployment along an interior side of a vehicle. In one exemplary embodiment the inflatable cushion has: an inflatable portion, the inflatable portion partially surrounding an area; a non-inflatable member secured to the inflatable portion and positioned in the area; and a retentive pocket formed by the non-inflatable member and the inflatable cushion, the retentive pocket having a periphery bounded on at least one side by the non-inflatable member and the non-inflatable member being configured such that a recessed area is formed in the retentive pocket, the recessed area being disposed within the periphery of the retentive pocket.

In another exemplary embodiment, an inflatable cushion for deployment along an interior side of a vehicle is provided, the inflatable cushion comprising: an inflatable portion, the inflatable portion surrounding an area, wherein no portion of the inflatable portion is disposed in the area; a non-inflatable member secured to the inflatable portion and positioned in the area; and a retentive pocket formed by the non-inflatable member and the inflatable cushion, the retentive pocket having a periphery bounded by the inflatable portion the non-inflatable member being configured such that a recessed area is formed in the retentive pocket, the recessed area being disposed within the periphery of the retentive pocket.

In yet another exemplary embodiment, an inflatable cushion is provided. The inflatable cushion comprising: a first inflatable portion; a non-inflatable member depending away from the first inflatable portion; and a retentive pocket formed on a portion of the non-inflatable member.

BRIEF DESCRIPTION OF THE DRAWINGS

FIG. 2 is a side view of another inflatable cushion;

FIG. 3 is a side view of another inflatable cushion constructed in accordance with an exemplary embodiment of the present invention;

DETAILED DESCRIPTION OF EXEMPLARY EMBODIMENTS

Figure 1:
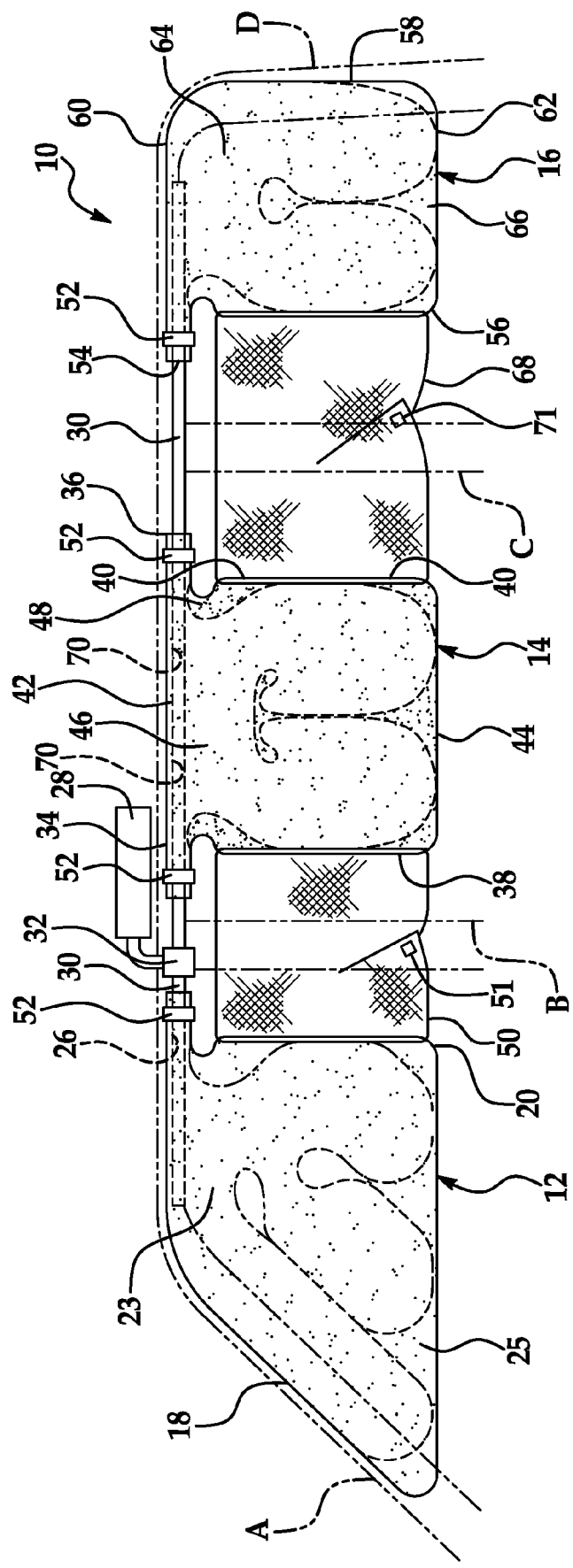
FIG. 1 is a side view of an inflatable cushion constructed in accordance with an exemplary embodiment of the present invention.
Figure 4:
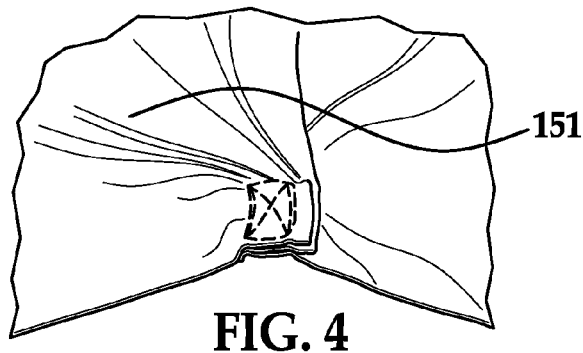
FIGS. 4 and 5 are views illustrating pleats on non-inflated portions of an inflatable cushion constructed in accordance with an exemplary embodiment of the present invention.
Figure 5:
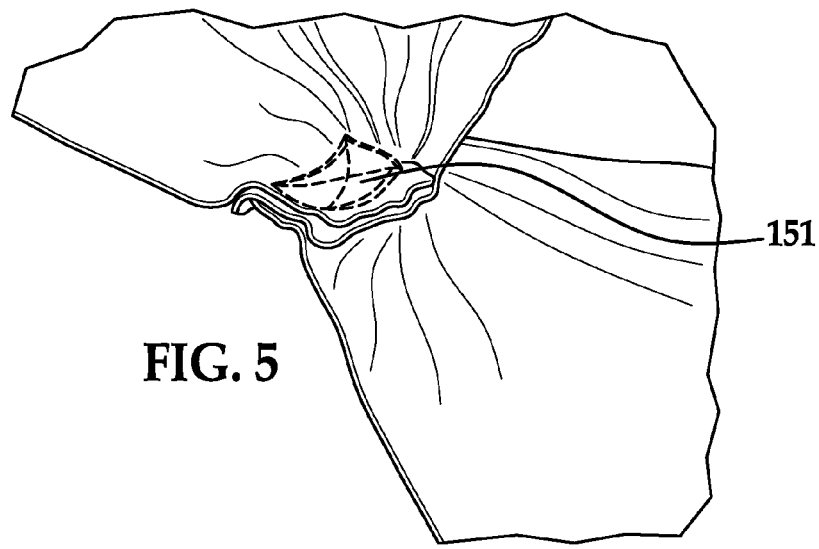

This disclosure in one embodiment relates to an inflatable cushion and method of manufacture wherein the cushion has separate cushion sections that are manufactured separately and assembled together to provide an extended inflatable cushion, which is less expensive to manufacture as areas not requiring inflation are not covered by inflatable portions of the cushion, which typically add to the related manufacturing costs. In accordance with an exemplary embodiment, the non-inflated sections of the inflatable cushion are provided with pleats or pleated areas to provide a desired configuration to the non-inflated section as well as the inflatable cushion. In one exemplary embodiment separate cushion sections are manufactured for assembly into various configurations for use in various vehicles having various sizes and configurations. In another exemplary embodiment, the inflatable cushion comprises a single inflatable portion with a single non-inflatable portion.

This application is related to U.S. patent application Ser. No. 11/229,329, filed Sep. 16, 2005 and U.S. patent application Ser. No. 10/914,884, filed Aug. 10, 2004 the contents each of which are incorporated herein by reference thereto.

The fabric used for the inflatable cushion in airbag modules is a significant portion of the total cost for the module. This is especially true for curtain airbags due to the large size of the cushion. It is further magnified on systems employing low-permeability fabrics and sealed seams in order to provide longer inflation periods without increasing the size of the inflator to provide a longer duration output to overcome the loses of the gases from the cushion. One piece woven constructions are desired due to the retention capabilities. An example of such construction is found in U.S. Pat. No. 6,220,309 the contents of which are incorporated herein by reference thereto. However, for very large cushions the cost is again increased because it can be difficult to package several cushions side-by-side on the fabric roll.

Often, the curtain cushions have large un-inflated regions. These areas sometimes correspond to the areas between seats where inflatable sections are not required however, the retentive characteristics of the inflatable cushion may still be desired. In order to minimize the cost of the cushion a composite construction method may be employed. It being understood the composite and non-composite constructions are within the scope of exemplary embodiments of the present invention. The composite construction allows the un-inflated regions to be made of a low-cost material that could then be attached to the one-piece woven sections or more expensive sections. The one-piece woven sections would be smaller and therefore result in more efficient nesting of the patterns on the sheets of material used for the inflatable cushions thus, less material waste is caused by smaller cushion sizes as they provide greater availability of orientations on a piece of material of a given size. In other words by reducing the size of the cushion the smaller cushions are able to be orientated in various positions on a standard sheet (limited by manufacturing constraints) of the material used for the inflatable cushion thus, the multiple cushions may be placed on a single sheet in various orientations to limit waste materials. A single inflator would be used and the gas would be delivered to the inflatable, one-piece woven sections using a diffuser tube.

In addition, and in accordance with an exemplary embodiment a pleat is also positioned in the un-inflated portion or single sheet to provide a desired deployment configuration of the inflatable cushion. In one exemplary embodiment, the pleat forms a containment area or retentive pocket on a portion of the single sheet or non-inflated portion.

Referring now to FIG. 1, an airbag or inflatable cushion 10 constructed in accordance with exemplary embodiments of the present invention is illustrated. As illustrated, inflatable cushion 10 is manufactured and constructed in order to traverse from the A pillar to a D pillar of a vehicle, as illustrated by the dashed lines in FIG. 1. It is, of course, understood that inflatable cushion 10 is configurable to cover other arrangements (e.g., A pillar to B pillar, A pillar to C pillar and B pillar to C pillar etc.). In one exemplary embodiment separate cushion sections are manufactured for assembly into various configurations for use in various vehicles having numerous size configurations. These sections comprise the inflatable portions, which comprise the more expensive portions or materials of the inflatable cushion.

As illustrated, inflatable cushion 10 comprises a first forward section 12, a second section 14 and a third rear section 16. First section 12 comprises a forward leading edge 18, a rearward edge 20, an upper portion 22 and a lower edge 24. In accordance with an exemplary embodiment, the leading edge 18 is configured to have an angled portion that traverses towards the vehicle windshield. It is also noted that sections 14 and 16 may also be configured to have angled sections or alternatively a pair of sections 12 may be combined with section 14 thus angled portions will be at either end of the cushion. These various configurations allow the assembled cushion to be used with various vehicle configurations. In an exemplary embodiment section 12 also comprises inflatable portions 23 and un-inflatable portions 25. The un-inflatable portions are positioned in areas not requiring inflation thus, the inclusion of un-inflatable portions 25 will reduce the inflator output required to inflate the section. In addition, the un-inflatable portions may also be configured to assist in deployment of the section or the inflatable cushion and a particular direction.

In order to provide first section 12 with inflation output from an inflator, an inflation opening 26 is in fluid communication with inflatable portions 23. An inflator 28, in accordance with technologies known to those skilled in the art, provides an inflation output to inflation opening 26 via one end of a fluid dispersing conduit 30. In accordance with an exemplary embodiment, fluid dispersing conduit 30 comprises tubing such as a plastic or metal pipe or conduit, or woven tubing. Fluid dispersing conduit 30 comprises a fluid inlet 32 that provides fluid communication between an outlet opening of the inflator 28 and fluid dispersing conduit 30. It is, of course, understood and as applications may vary, the positioning of the inflator may be located in other positions than those illustrated in the drawings. For example, the inflator may be located in a forward vehicle position. Thus, the presented location is provided as an example and the present invention is not intended to be limited by the same. In yet another alternative, the inflator may be remotely located and a conduit or other fluid providing means is used to supply the inflating gas from the inflator to the inflatable cushion.

At another end of fluid dispersing conduit 30 a first inflation opening 34 of a forward end 38 of second section 14 is in fluid communication with fluid dispersing conduit 30. In the embodiment of FIG. 1, second section 14 also comprises a rearward edge 40, an upper edge 42 and a lower edge 44. Similar to first section 12, second section 14 comprises inflatable portions 46 and un-inflatable portions 48.

As illustrated in FIG. 1 an un-inflated single layer section 50 is disposed between rearward edge 20 of first section 12 and forward edge 38 of second section 14. In accordance with an exemplary embodiment section 50 may comprise a single layer of fabric or alternatively, a layer of webbing or net that will traverse the expanse between the two sections.

In an exemplary embodiment, un-inflated single layer section 50 comprises a portion of the inflatable cushion 10, which traverses an area not requiring an inflatable cushion (e.g., the area of the cushion which will traverse across the B pillar of the vehicle or portion of the vehicle that is between the doors and accordingly the seats of the vehicle). Of course, un-inflated section 50 may traverse other areas of the vehicle not having structural members associated therewith. Moreover and in accordance with an exemplary embodiment, un-inflated section 50 may be located in areas wherein the same is required for a retentive barrier.

Accordingly, and through the use of un-inflated section 50 the overall amount of material required for inflatable portions of the inflatable cushion is reduced thereby reducing the overall cost of the inflatable cushion. In addition, the configurations of first section 12 and second section 14 allow the same to be manufactured in separate manufacturing steps, which allows for modular construction of the inflatable cushion wherein un-inflated section 50 and fluid dispersing conduit are secured to first section 12 and second section 14 during separate manufacturing steps, which can be performed at separate manufacturing facilities.

In addition, un-inflated single layer section 50 is provided with a pleat 51 or a plurality of pleats. As used herein "pleat" is intended to refer to a portion or area of the un-inflated single layer section 50 that is configured to provide or form a retentive pocket in the un-inflated section. For example, in one non-limiting exemplary embodiment, the pleat comprises a portion of the un-inflated layer that is folded upon itself and secured together to vary the configuration of un-inflated single layer section 50.

In another exemplary embodiment, the retentive pocket is formed by cutting a portion of the un-inflated section and thereafter sewing or securing the edges together to provide the retentive pocket. Thus, the pleat is formed by sewing or securing the edges of an opening cut in the un-inflated section back together (for example, see FIG. 1).

Figure 10:
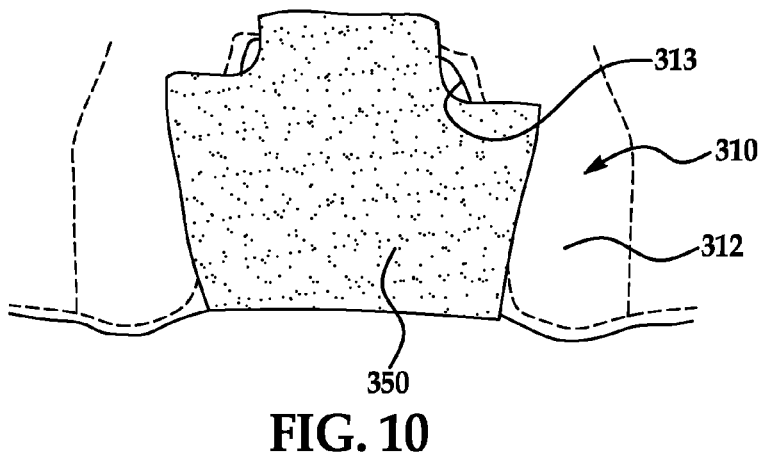
FIGS. 10 and 11 are illustrations of still another alternative exemplary embodiment of the present invention.
Figure 11:
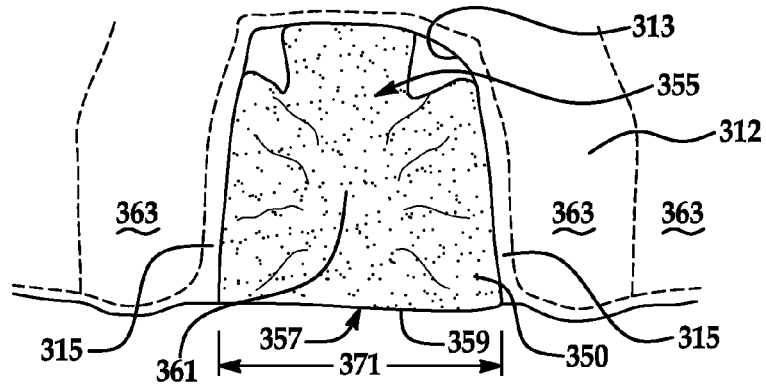

In yet another exemplary embodiment, the retentive pocket is formed by configuring a lower edge of the un-inflated layer to have a peripheral configuration such that when secured to the inflatable portion or portions the retentive pocket is formed (for example see FIGS. 10 and 11).

Referring back now to FIG. 1, pleat 51 comprises a portion of the un-inflated section that is sewn upon itself to modify the configuration of the un-inflated section to provide a desired effect when the inflatable cushion is deployed and inflated. In one exemplary embodiment, the "desired effect" is to provide a retentive barrier in the area between the inflatable section of the inflatable cushion (e.g., area 50 and other areas as will be discussed herein). Another "desired effect" of the pleat or exemplary embodiment of the present invention is to provide the retentive barrier without the need of separately applying tension along the entire lower edge or a portion of the lower edge of the inflatable cushion when it is deployed and inflated. Non-limiting examples of devices for providing tension along the lower edge of the inflatable cushion include tethers, wherein a first tether is secured to a forward edge of the inflatable cushion and a portion of the vehicle frame and a second tether is secured to a rearward edge of the inflatable cushion and a portion of the vehicle frame.

In other words and by pleating a portion of the un-inflated single layer a retentive pocket is formed in the un-inflated portion, wherein the pleat forms an edge or peripheral portion of the retentive pocket. Thus, the retentive pocket forms a retentive barrier in the non-inflated portion of the inflatable cushion without requiring the need to provide tension along the bottom edge of the inflatable cushion.

Although, the embodiment of FIG. 1 illustrates the non-inflatable portion as comprising a single layer it is understood that exemplary embodiments of the present invention contemplate numerous configurations wherein the inflatable sections and non-inflatable sections may comprise a single layer or multiple layers, a single cushion or segmented cushion secured together and combinations thereof wherein a retentive pocket is formed in the non-inflatable portion and wherein the retentive pocket is formed without providing tension along an entire lower edge or a portion of a lower edge of the inflatable cushion.

In order to provide a robust securement about fluid dispersing conduit 30 a securement means 52 is provided to secure a portion of the inflatable sections about fluid dispersing conduit 30. A non-limiting example of securement means 52 is a band clamp. Other contemplated means include adhesives and/or welding techniques.

In a similar fashion a fluid dispersing conduit 30 provides fluid communication between second inflation opening 36 and an inflation opening 54 of rear section 16. Similarly to the other sections, rear section 16 has a forward leading edge 56, a rearward edge 58, an upper edge 60 and a lower edge 62. Section 16 also comprises inflatable portions or chambers 64 and non-inflatable portions 66. In accordance with an exemplary embodiment rearward edge 58 is configured to match a profile of a rearward portion of the vehicle. An un-inflated single layer section 68 is disposed between rearward edge 40 of second section 14 and forward edge 56 of third section 16.

In an exemplary embodiment, un-inflated single layer section 68 comprises a portion of the inflatable cushion 10, which traverses an area not requiring an inflatable cushion, e.g., the area of the cushion, which will traverse across the C pillar of the vehicle and correspond to a location not adjacent to a seat of the vehicle thus, an area not requiring an inflatable section. Un-inflated single layer section 68 is secured to rearward edge 40 of second section 14 and forward edge 56 of third section 16 via stitching or welding or other equivalent securement means during an assembly step when cushion 10 is assembled.

Again, un-inflated section 68 is also provided with a pleat 71 to provide a desired deployment configuration of the inflatable cushion. In one exemplary embodiment, the pleat provides a containment area on a portion of the single sheet or non-inflated portion.

It is also understood that the configuration of the inflatable cushion may vary and the illustrations of the sections in the Figures are provided as examples and the present invention is not intended to be limited to the specific configurations provided in the figures, as they are considered ancillary to the present invention. For example, the un-inflated sections may traverse other areas of the vehicle, which may or may not correspond to the location of the pillars of the vehicle frame.

Moreover, the present invention is contemplated for use with numerous other vehicle configurations. For example, the vehicle may include three rows of seats; such vehicles include but are not limited to sports utility vehicles, station wagons, vans or minivans. Conversely, the vehicle may comprise only a single row of seats such vehicles include but are not limited to sports coupes.

Prior to deployment, the inflatable cushion is stored in a compartment mounted to the roof rail or proximate to the roof rail. In order to store the airbag into the compartment the un-inflated airbag is folded into a configuration which allows it to occupy a small discrete area within the vehicle interior. In accordance with exemplary embodiments of the present invention, the inflatable cushion is folded by a machine in order to provide the configurations disclosed herein. It is also possible to fold the inflatable cushion by hand.

When a predetermined activation event or occurrence is detected, the inflatable cushion is inflated by gas from the inflator. In general, the inflator will receive an inflation or deployment signal that causes the inflator to generate an inflation gas or inflation output for inflating the inflatable cushion. In an exemplary embodiment, the deployment signal is generated by a controller, such as a microcontroller of a sensing and diagnostic module configured for use with the airbag module. The sensing and diagnostic module receives a plurality of signals from appropriate sensing devices (e.g., door mounted accelerometers), and will generate a deployment signal if a predetermined activation event has been sensed.

Referring now to FIGS. 2 and 3, another exemplary embodiment of the present invention is illustrated. Here an inflatable cushion 110 is illustrated without a pleat (FIG. 2) and with a pleat (FIG. 3). In this embodiment cushion 110 has a slightly different configuration than the inflatable cushion illustrated in FIG. 1. Here a first inflatable section 112 is fluidly connected to another inflatable section 114 via a connecting section 115 of the inflatable cushion. In one exemplary embodiment, inflatable section 115 is integrally formed with inflatable sections 112 and 114 and the inflatable sections/members and non-inflatable sections comprise multiple layers of fabric. In other words, at least two layers of fabric are sewn and sealed together to form cushion 110, wherein the inflatable chambers and non-inflatable sections are formed by the sealing of the two layers together. It is also understood that cushion 110 may be formed from multiple layers comprising more than three layers. In addition and in yet another embodiment, the inflatable sections are formed from two layers and the non-inflatable sections are formed from a single layer or two or more layers. As illustrated, at least three non-inflated sections 149, 150 and 168 are provided. In this embodiment, a pleat 151 is positioned on non-inflated section 150, creating a retentive pocket 161.

Figure 6:
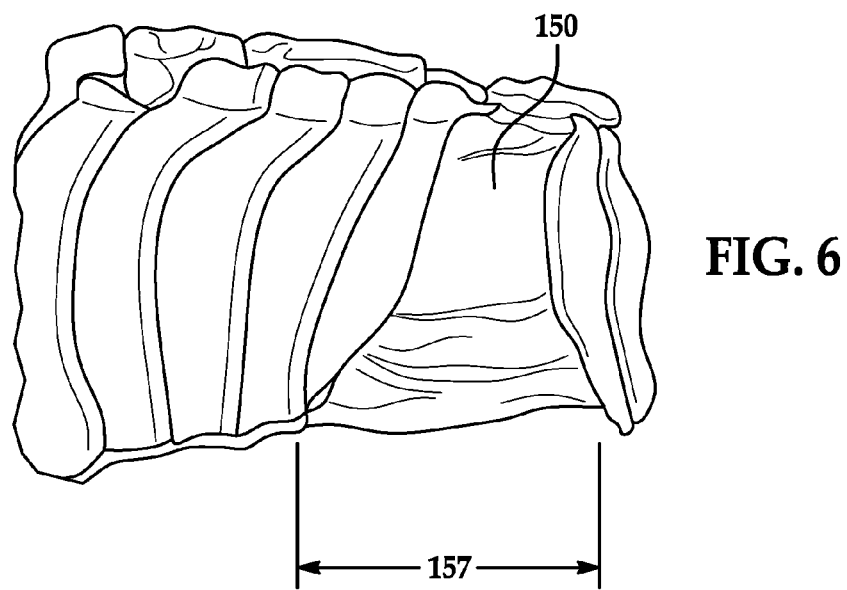
FIG. 6 is a view of a deployed inflatable cushion without a pleat.
Figure 7:
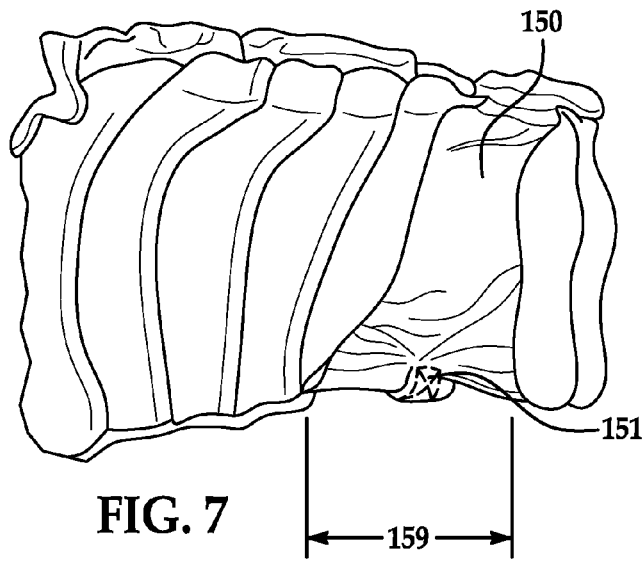
FIG. 7 is a view of a deployed inflatable cushion with a pleat.

Non-limiting examples of the construction of the retentive pocket are illustrated in FIGS. 11-14. Although a single pleat is shown, exemplary embodiments of the present invention contemplate a single pleat, a plurality of pleats, each of which may be disposed along a lower edge of the non-inflated section or in another portion of the non-inflated section as long as the desired effect is achieved. FIG. 6 illustrates the inflation or deployment of an inflatable cushion without a retentive pocket while FIG. 7 illustrates the inflation or deployment of an inflatable cushion with a retentive pocket. As illustrated, a lower edge 157 of un-inflated section 150 of the inflatable cushion of FIG. 6 is longer than a lower edge 159 of un-inflated section 150 of the inflatable cushion of FIG. 7.

Figure 8:
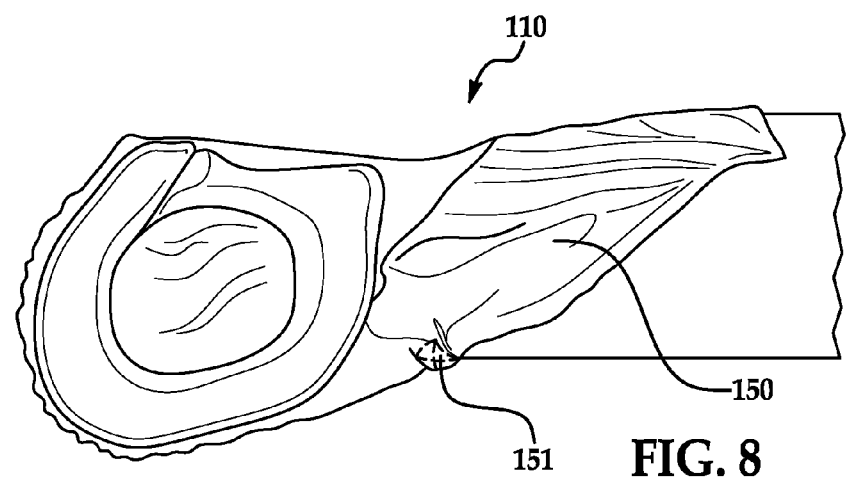
FIG. 8 is a view of a deployed inflatable cushion in accordance with alternative exemplary embodiment of the present invention.

FIG. 8 illustrates an inflated or deployed inflatable cushion having un-inflated sections comprising a single sheet of fabric with a pleated section to provide the desired deployment configuration of the un-inflated section as well as the inflatable cushion as a whole.

Figure 9:
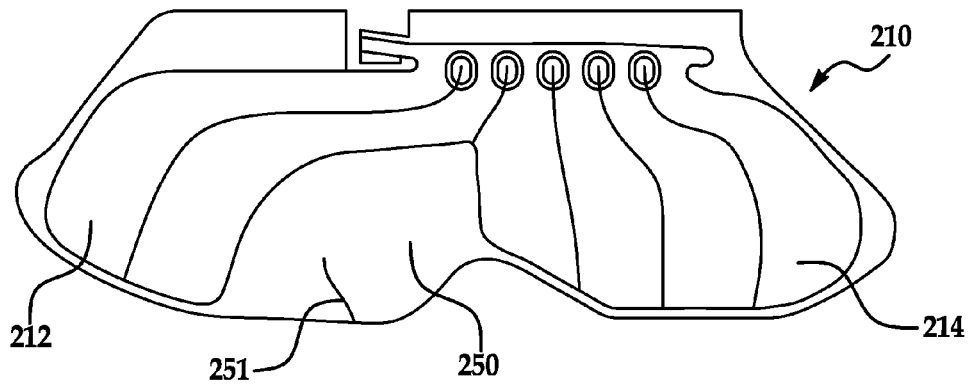
FIG. 9 is a schematic illustration of another alternative exemplary embodiment of the present invention.

Referring now to FIG. 9 yet another exemplary embodiment of the present invention is illustrated. Here inflatable cushion 210 is formed via a pair of sheets of fabric sewn together wherein an inflatable portion 212 is in fluid communication with another inflatable portion 214 and the non-inflated member 250 comprises at least two sheets of fabric sewn together and the pleat is located on the non-inflated member, wherein at least one or both of the sheets of the non-inflatable member are folded and secured together to form the pleat and the non-inflated member provides the retentive pocket on the inflatable cushion.

In accordance with exemplary embodiments of the present invention although a pleat is shown as a means for providing the retentive pocket other means for providing a retentive pocket in the non-inflatable section of the inflatable cushion are contemplated to be within the scope of the present invention.

Referring now to FIGS. 10 and 11 an alternative exemplary embodiment of the present invention is illustrated. Here a portion of an inflatable cushion 310 for deployment along an interior side of a vehicle is illustrated. The inflatable cushion has an inflatable portion 312. As illustrated, the inflatable portion partially surrounds an area 313 when the inflatable portion is inflated. Area 313 corresponds to an area not comprising inflatable portions of the inflatable cushion. The inflatable cushion further comprises a non-inflatable member 350 secured to the inflatable portion and positioned in the area. The non-inflatable member and the inflatable cushion forms a retentive pocket 355 for receiving a portion of an occupant therein when the inflatable cushion is inflated. The retentive pocket has a periphery 357 bounded on at least one side 359 by an edge of the non-inflatable member and the non-inflatable member is configured such that a recessed area 361 is formed in the retentive pocket. The recessed area being disposed within the periphery of the retentive pocket that is defined by the non-inflatable member and the edges of the inflatable member.

In one exemplary embodiment, the recessed area of the retentive pocket is centrally located within the non-inflatable member. Of course, the recessed area may be disposed anywhere in the area or non-inflatable member.

Figure 12:
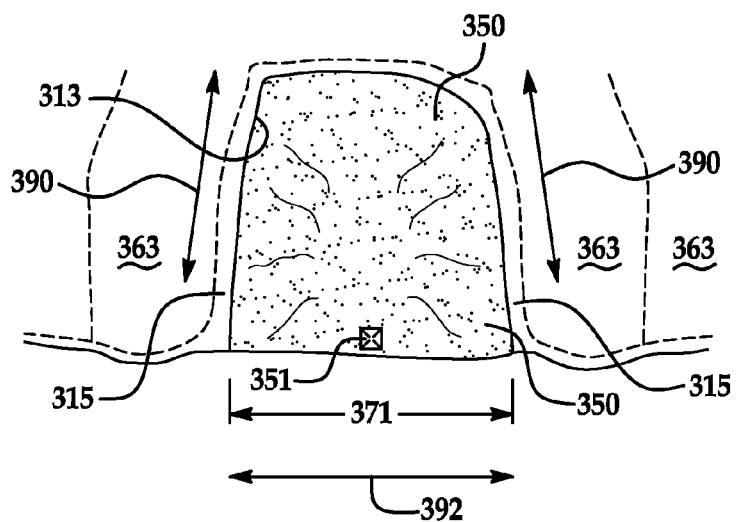
FIG. 12 is an illustration of an exemplary embodiment of the present invention.

In another alternative embodiment and as illustrated in FIG. 12, the periphery of the retentive pocket bounded by the non-inflatable member further comprises a pleat 351. In one non-limiting exemplary embodiment, the pleat comprises a portion of the non-inflatable member that is folded and secured together. Furthermore, and as illustrated in FIG. 12 the pleat is located on a lower edge of the inflatable cushion. Of course, other locations are contemplated to be within the scope of exemplary embodiments of the present invention.

In one non-limiting exemplary embodiment, the non-inflatable member is a single layer of fabric and the inflatable portion further comprises a plurality of inflatable cells 363.

As illustrated in FIGS. 10 and 11, the non-inflatable member comprises an oversized shaped panel, wherein a lower portion controls a distance between edges of the inflatable cushion. Here a periphery of an upper portion of the non-inflatable member is larger than the periphery it is secured to thus and when the non-inflatable member is sewn in place slack is built therein to form the retentive pocket.

As illustrated in FIGS. 10 and 11, the area 313 is defined by a first perimeter, the first perimeter being further defined by an edge 315 of the inflatable cushion and a gap 371 between the edge of the inflatable cushion defining a portion of the first perimeter. Furthermore, the non-inflatable member has a second perimeter, the second perimeter being larger than the first perimeter, the second perimeter being further defined by a first edge portion and a second edge portion, the first edge portion traversing the gap defined by the edge of the inflatable cushion defining a portion of the first perimeter and the first edge portion has a distance less than a length of the gap when the inflatable cushion is inflated and when the non-inflatable member is not secured to the inflatable cushion.

An upper edge portion or second edge portion of the non-inflatable member is at least partially secured to the edge of the inflatable cushion defining a portion of the first perimeter.

Figure 13A:
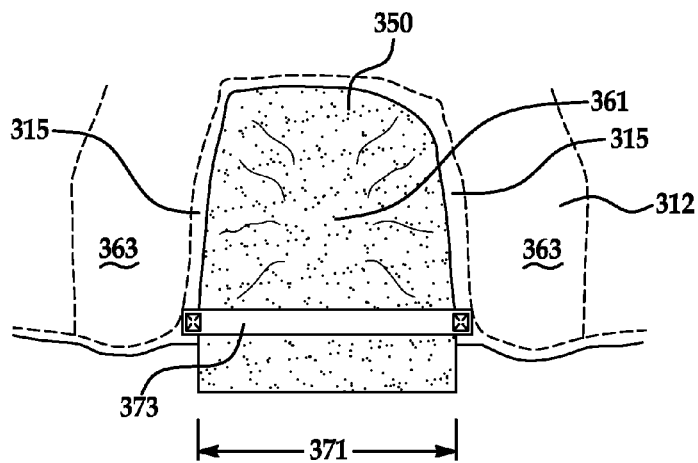
FIGS. 13A and 13B illustrate still another alternative exemplary embodiment of the present invention.
Figure 13B:
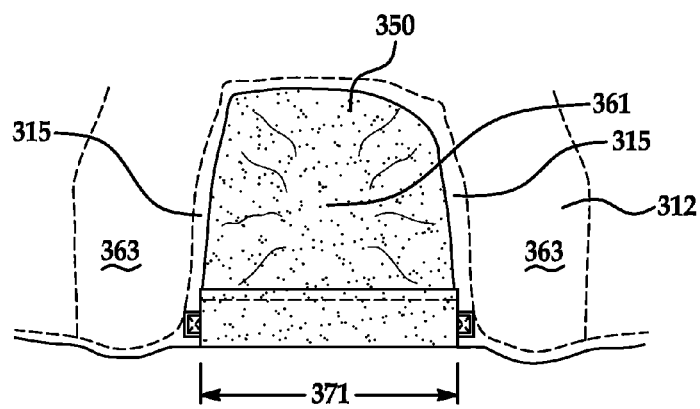

Referring now to FIGS. 13A and 13B, an alternative exemplary embodiment is disclosed. Again, the area is defined by a first perimeter, the first perimeter being further defined by an edge 315 of the inflatable cushion and a gap between the edge of the inflatable cushion defining a portion of the first perimeter. In this embodiment, a tether 373 is secured to the edge of the inflatable cushion defining the portion of the first perimeter and also defining the gap, the tether traversing the gap and providing a limit to a size of the gap when the inflatable cushion is inflated. The non-inflatable member has a second perimeter, the second perimeter being larger than the first perimeter, the second perimeter is further defined by a first edge portion and a second edge portion, the first edge portion traversing the gap and second edge portion is secured to the edge of the inflatable cushion defining the area. The second edge portion has a greater length or distance than the edge of the inflatable cushion defining the area such that a portion of the non-inflatable member extends past the gap and then the first edge portion is secured (e.g., stitching, adhesives, welding, etc.) to the non-inflatable member such that the tether is at least partially enclosed in the non-inflatable member.

Figure 14:
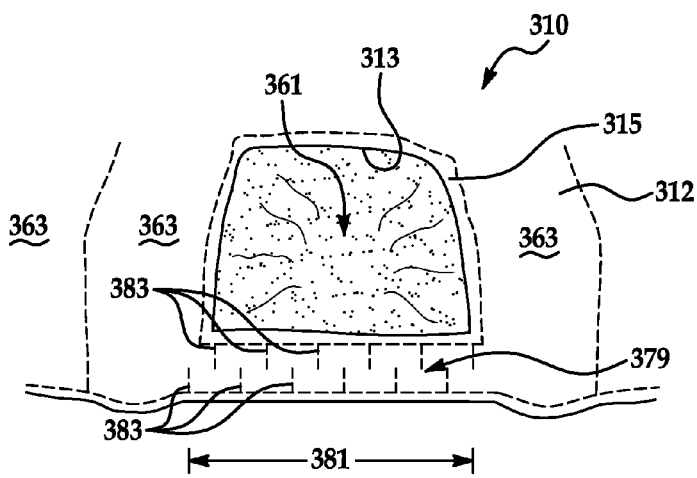
FIG. 14 is a schematic illustration of another alternative exemplary embodiment of the present invention.

In another alternative exemplary embodiment and referring now to FIG. 14, the inflatable portion surrounds the area 313 and no portion of the inflatable portion is disposed in the area. The non-inflatable member is disposed in the area and is secured to the inflatable portion and the retentive pocket formed by the non-inflatable member and an edge of the inflatable portion, the edge bounding a periphery of the non-inflatable member. In this embodiment, the non-inflatable member is configured such that a recessed area is formed in the retentive pocket, the recessed area being disposed within the periphery of the retentive pocket.

Here the perimeter of the area is bounded by a lower edge portion 379 of the inflatable portion. In accordance with an exemplary embodiment of the present invention, the lower edge portion of the inflatable portion is constrained to limit a lateral expansion (e.g., in the direction of arrows 381) of the lower edge portion of the inflatable portion.

In one exemplary embodiment, the lower edge portion of the inflatable portion is a tubular member and the tubular member has portions 383 stitched together in an alternating fashion to limit an expanded size of the tubular member when the inflatable cushion is inflated. Portions 383 are configured to allow inflation gases to pass therethough and therein to allow for inflation of the tubular member.

In one non-limiting exemplary embodiment, the non-inflatable member is a single layer of fabric and the inflatable portion further comprises a plurality of inflatable cells and the recessed area of the retentive pocket is centrally located in the non-inflatable member. Of course, other configurations are contemplated to be within the scope of exemplary embodiments of the present invention.

In accordance with exemplary embodiments of the present invention the inflatable cushion is configured to provide a retentive pocket when the same is inflated in accordance with a predetermined activation event. In some embodiments, a non-inflatable member provides the retentive pocket wherein a lower edge of the non-inflatable member is provided with little or no tension along the lower edge prior to interaction with an occupant and after interaction with the occupant the lower edge of the non-inflatable member is provided with tension and the retentive pocket contains a portion of the occupant therein. In one exemplary embodiment, the pleat provides the tension along the lower edge after an occupant interacts with the retentive pocket. Moreover, and during occupant interaction of the inflatable cushion a vertical tension is created to portions of the inflatable cushion. The vertical tension being created due to occupant interaction and tension being applied along the lower edge of the pocket and/or cushion from the interaction. As referred to herein, vertical tension is shown by arrows 390 while horizontal or tension along the lower edge is shown by arrows 392 in FIG. 12. It being understood, that the vertical tension may be angularly positioned with respect to the horizontal or tension along the lower edge and that the tension along the lower edge may be at any angle. Furthermore, the horizontal and vertical tension may be found in any of the embodiments of the present invention although not specifically illustrated by arrows 390 and 392. It is, of course, understood that vertical tension and horizontal tension ultimately depends on the cushion configuration and the occupant interaction.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An inflatable cushion for deployment along an interior side of a vehicle, comprising:

an inflatable portion, the inflatable portion partially surrounding an area when the inflatable portion is inflated;

a non-inflatable member secured to the inflatable portion and positioned in the area; and a retentive pocket formed by the non-inflatable member, the retentive pocket having a periphery bounded on at least one side by the non-inflatable member and a peripheral portion of the non-inflatable member is configured to create a recessed area in the retentive pocket when the non-inflatable member is secured to the inflatable portion and the inflatable portion is in an inflated state, the recessed area being disposed within the periphery of the retentive pocket; and wherein the area has a first perimeter defined by a portion of an edge of the inflatable cushion partially surrounding the area and a gap located between a first edge portion and a second edge portion of the portion of the edge of the inflatable cushion partially surrounding the area; and wherein the non-inflatable member has a second perimeter, the second perimeter being larger than the first perimeter and being defined by a first edge portion of the non-inflatable member and a second edge portion non-inflatable member, the second edge portion of the non-inflatable member being secured to the portion of the edge of the inflatable cushion partially surrounding the area and being located between the first edge portion and the second edge portion of the portion of the edge of the inflatable cushion partially surrounding the area and the first edge portion of the non-inflatable member traversing the gap, the first edge portion of the non-inflatable member having a dimension that is less than a dimension of the gap that corresponds to when the inflatable cushion is inflated and when the non-inflatable member is not secured to the inflatable cushion.

2. The inflatable cushion as in claim 1, wherein the second edge portion of the non-inflatable member is at least partially secured to the portion of the edge of the inflatable cushion partially surrounding the area.

3. The inflatable cushion as in claim 1, wherein the recessed area of the retentive pocket is centrally located in the non-inflatable member and interaction of the inflatable cushion with an occupant creates a vertical tension and horizontal tension in areas of the inflatable cushion surrounding the retentive pocket.

4. An inflatable cushion for deployment along an interior side of a vehicle, comprising:
   an inflatable portion, the inflatable portion surrounding an area, wherein no portion of the inflatable portion is disposed in the area, the area being defined by a perimeter;
   a non-inflatable member secured to the inflatable portion and positioned in the area, the non-inflatable member being defined by a perimeter and wherein the non-inflatable member does not have any tear seams and wherein the perimeter of the non-inflatable member is greater than the perimeter of the area; and
   a retentive pocket formed by the non-inflatable member and the inflatable cushion, the retentive pocket having a periphery partially bounded by the inflatable portion and the non-inflatable member being configured such that a recessed area is formed in the retentive pocket, the recessed area being disposed within the periphery of the retentive pocket.

5. The inflatable cushion as in claim 4, wherein the area is defined by a perimeter, the perimeter having an edge portion bounded by a lower edge portion of the inflatable portion, the lower edge portion of the inflatable portion being constrained to limit a lateral expansion of the lower edge portion of the inflatable portion.

6. The inflatable cushion as in claim 4, wherein the lower edge portion of the inflatable portion is a tubular member and the tubular member has portions stitched together in an alternating fashion to limit an expanded size of the tubular member when the inflatable cushion is inflated.

7. The inflatable cushion as in claim 4, wherein the non-inflatable member is a single layer of fabric and the inflatable portion further comprises a plurality of inflatable cells.

8. The inflatable cushion as in claim 4, wherein the recessed area of the retentive pocket is centrally located in the non-inflatable member and interaction of the inflatable cushion with an occupant creates a vertical tension and horizontal tension in areas of the inflatable cushion surrounding the retentive pocket.

\* \* \* \* \*